(12) United States Patent
Elvey et al.

(10) Patent No.: US 8,461,874 B2
(45) Date of Patent: Jun. 11, 2013

(54) PREVENTING A-B-A RACE IN A LATCH-BASED DEVICE

(75) Inventors: Dwight K. Elvey, Santa Cruz, CA (US); Someshwar Gatty, Sunnyvale, CA (US); Premlatha Paga, legal representative, Nacharam (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 140 days.

(21) Appl. No.: 13/187,163

(22) Filed: Jul. 20, 2011

(65) Prior Publication Data
US 2013/0021064 A1    Jan. 24, 2013

(51) Int. Cl.
*H03K 19/20*    (2006.01)
(52) U.S. Cl.
USPC .............................................. 326/93; 326/97
(58) Field of Classification Search
None
See application file for complete search history.

(56) References Cited

U.S. PATENT DOCUMENTS 6,204,695 B1 *    3/2001    Alfke et al. ...................... 326/93

* cited by examiner

*Primary Examiner* — Crystal L Hammond
(74) *Attorney, Agent, or Firm* — Harrity & Harrity, LLP (57) ABSTRACT

A device may include a latch activated during a second phase of a clock cycle; a clock gating component to control when a clock signal is to reach the latch; a destination storage element activated during a first phase of the clock cycle, where a logical path exists from the latch to the destination storage element; and a blocking element located in the logical path from the latch to the destination storage element, where the blocking element includes, as a first input, an output of the latch and, as a second input, an output of the clock gating component, and where the blocking element prevents an output value of the latch from changing when the clock gating component is not enabled and does not prevent the output value of the latch from changing when the clock gating element is enabled.

20 Claims, 8 Drawing Sheets

PREVENTING A-B-A RACE IN A LATCH-BASED DEVICE

BACKGROUND INFORMATION

Digital devices, such as microprocessors, may include sequential logic elements in combination with storage elements, which may be synchronized by a clock signal. Two types of storage elements are flip-flops and latches. A flip-flop may be responsive to input during a rising (or falling) edge of a clock cycle, while a latch may be responsive to input while a clock signal stays high (or low). Thus, a flip-flop may be an edge-triggered device while a latch may be a level-triggered device. Since flip-flops may be easier to synchronize, many digital device designs use flip-flops as the storage elements. However, in high performance applications, latches may be employed, as the use of latches may enable a digital device to take advantage of both halves of a clock cycle. A latch-based design may need to take into account the possibility of race conditions. A race condition may result when the output of a sequence of signals may depend on two or more signals racing each other to influence the output, resulting in unpredictable behavior. Avoiding race conditions in a latch-based design of a digital device may be necessary for proper performance of the digital device.

SUMMARY OF EMBODIMENTS OF THE INVENTION

According to one aspect, a device may include a latch activated during a second phase of a clock cycle; a clock gating component to control when a clock signal is to reach the latch; a destination storage element activated during a first phase of the clock cycle, where a logical path exists from the latch to the destination storage element; and a blocking element located in the logical path from the latch to the destination storage element, where the blocking element includes, as a first input, an output of the latch and, as a second input, an output of the clock gating component, and where the blocking element prevents an output value of the latch from changing when the clock gating component is not enabled and does not prevent the output value of the latch from changing when the clock gating element is enabled.

According to another aspect, a method may include determining whether clock gating of a latch, included in a digital device, can be correlated with clock gating of either a destination storage element or a source storage element, based on a layout of the digital device, where the latch is in a logical path from the source storage element to the destination storage element; correlating the clock gating of the latch with the clock gating of either the destination storage element or source storage element, when the clock gating of the latch can be correlated with the clock gating of either the destination storage element or source storage element; and adding a blocking element to a logical path from the latch to the destination storage element, where the blocking element includes, as a first input, an output of the latch and, as a second input, an output of a clock gating component associated with the latch, and where the blocking element prevents an output value of the latch from changing when the clock gating component is not enabled, when the clock gating of the latch cannot be correlated with the clock gating of either the destination storage element or source storage element.

According to yet another aspect, a method may include receiving, by a computer device, a digital device design; selecting, by the computer device, a test bit pattern; applying, by the computer device, the test bit pattern to the digital device design to receive a first bit pattern response; modifying, by the computer device, the digital device design by adding a blocking element to the digital device design, where the blocking element is added to a logical path from a latch, clocked during a second phase of a clock cycle, to a destination storage element, clocked during a first phase of the clock cycle; applying, by the computer device, the test bit pattern to the modified digital device design to receive a second bit pattern response; determining, by the computer device, whether the first bit pattern response matches the second bit pattern response; and designating, by the computer device, the digital device design as invalid when the first bit pattern response does not match the second bit pattern response and as valid when the first bit pattern response matches the second bit pattern response.

DETAILED DESCRIPTION

The following detailed description refers to the accompanying drawings. The same reference numbers in different drawings identify the same or similar elements.

An implementation described herein may relate to a latch-based digital device that prevents race conditions from occurring during testing and/or performance of the digital device. A latch-based digital device may include A-phase storage devices (which may include flip-flops and/or latches) and B-phase latches (referred to herein as "B-latches"). The A-phase storage devices may respond to input during a first part of a clock cycle, while B-latches may respond to input during a second part of the clock cycle. For example, the A-phase storage elements may respond to input at the rising edge of the clock cycle, while the B-latches may respond to new input while the clock signal is low.

Figure 1:
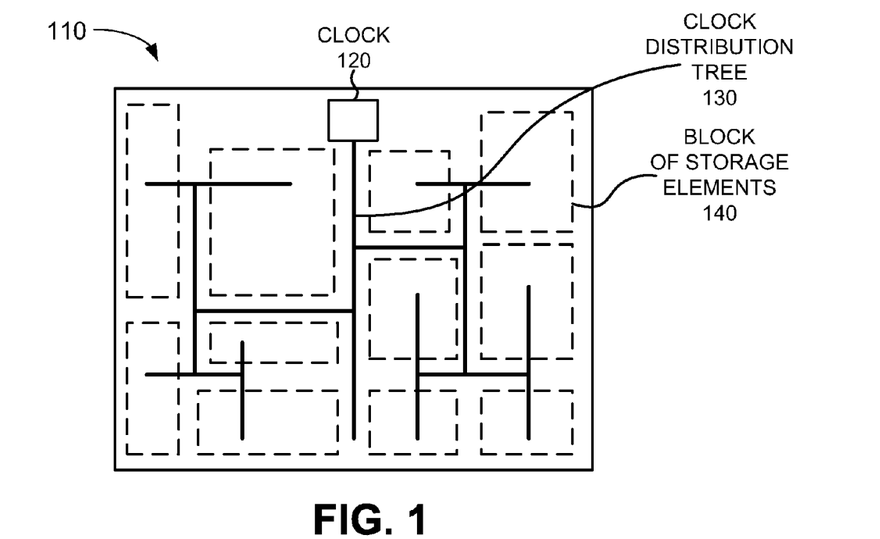
FIG. 1 is a diagram illustrating an example environment according to an implementation described herein.

FIG. 1 illustrates an example digital device 110. Digital device 110 may include combinatorial logic elements in combination with sequential logic elements (e.g., storage devices). Digital device 110 may correspond to, for example, a microprocessor. As shown in FIG. 1, digital device 100 may include a clock 120, a clock distribution tree 130, and blocks of storage elements 140. The storage elements in digital device 110 may be synchronized using a clock signal from clock 120. Clock 120 (e.g., a crystal) may generate a clock signal at a particular rate, and the signal may be delivered to the storage elements in the digital device using clock distribution tree 130. However, clock 120 and clock distribution tree 130 may be a major consumer of power in digital device 110. Therefore, power consumption may be reduced through clock gating. For example, a block of storage elements 140 may be linked to an enable signal that enables the storage elements when data is to be stored. If the enable signal is combined (e.g., ANDed) with the clock signal, the clock signal may be delivered to block of storage elements 140 only when data is to be stored in block of storage elements 140, resulting in significantly reduced power consumption.

Digital device 110 may include an A-B-A arrangement of storage elements, where A-phase storage elements are followed, in the data path, by B-latches, followed by other A-phase storage elements. During a typical sequence of clock cycles, data may be received by a first (e.g., source) A-phase storage element during a rising edge of a clock cycle, the output from the source A-phase storage element may be received by a B-latch during the low phase of the clock cycle, and the output from the B-latch may be received by a second (e.g., destination) A-phase storage element during a rising edge of a subsequent clock cycle.

The source A-phase storage element may be controlled by a first clock gater, the B-latch may be controlled by a second clock gater, and the destination A-phase storage element may be controlled by a third clock gater. Since the B-latch may be transparent to data during the whole half of a clock cycle, when all three gaters are active during a particular clock cycle, an A-B-A race may occur in which data may race through the B-latch and arrive at the destination A-phase storage element a clock cycle too early.

One way to avoid an A-B-A race may be to correlate the clock gating of the B-latch with either the source A-phase storage elements or with the destination A-phase storage elements. If the gating of the B-latch is correlated with either the source or the destination A-phase storage elements, the clock signal, which may be inverted from the A-phase clock signal, may always be turned off when the A-phase clock signal is on, and vice versa. However, correlation with the source or destination A-phase storage elements may not be possible. For example, it may not be possible to trace a physical connection from the A-phase clock gating signal to the B-latch clock gating signal.

Although FIG. 1 shows example components of digital device 110, in other implementations, digital device 110 may include fewer components, different components, differently arranged components, or additional components than depicted in FIG. 1. Additionally or alternatively, one or more components of digital device 110 may perform functions described as being performed by one or more other components of digital device 110.

An implementation described herein relates to including a blocking element (e.g., AND gate, OR gate, multiplexer, etc.) connected to an output of a B-latch and connected to an output of a functional gater for the B-latch. The blocking element may ensure that the B-latch is transparent to data only when the functional gater is active. An implementation described herein may further relate to combining a blocking element with destination correlation. For example, when a B-latch leads to multiple destination A-phase storage elements, the clock gating of some of the destination A-phase storage elements may be correlated with the clock gating of the B-latch, while others of the destination A-phase storage elements may not be able to be correlated with the clock gating of the B-latch. In such a situation, the blocking element may be added to the output of the B-latch in combination with correlating the clock gating of the B-latch with the clock gating of at least some of the destination A-phase storage elements.

Furthermore, an implementation described herein may relate to selecting a method of preventing an A-B-A race in a latch-based design from a group of available methods. For example, a design tool may select to correlate clock gating of a B-latch with destination or source gating, to drive clock gating of the B-latch by an inverted clock signal, to add a blocking element to a logic path between the output of the B-latch and a destination storage element, or to select a free running clock for the B-latch.

Moreover, an implementation described herein may relate to validating a B-latched design of a digital device based on whether the addition of a blocking element to a logic path between the output of a B-latch and a destination storage element changes the pattern response of a test pattern generated by a testing tool on a model of the digital device.

Figure 2:
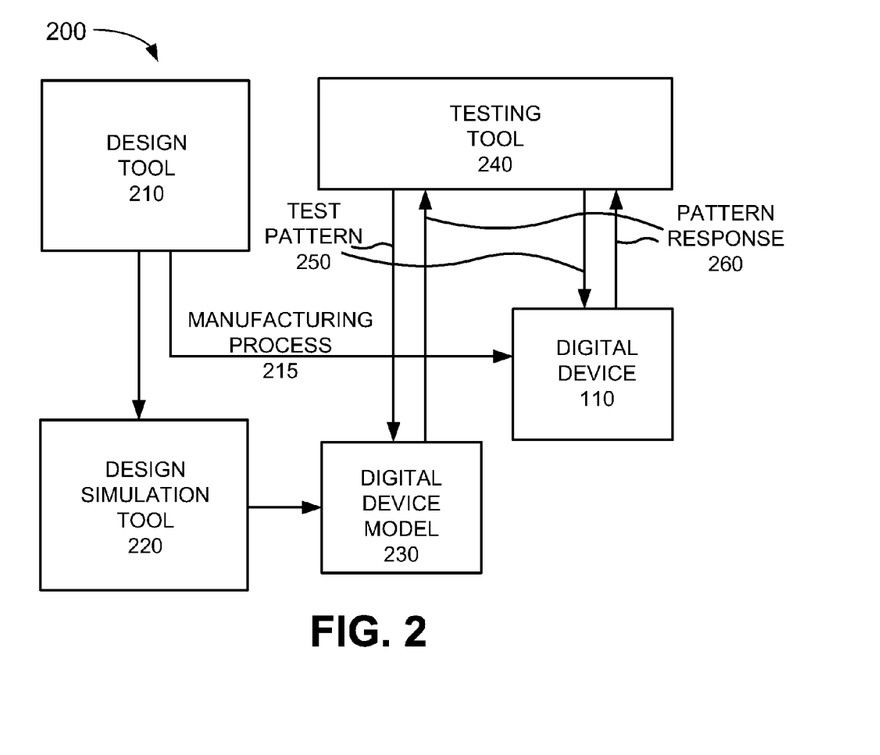
FIG. 2 is a diagram illustrating example components of a clock system of the digital device of FIG. 1.

FIG. 2 is a diagram of an example environment 200 in which the systems and/or methods, described herein, may be implemented. As shown in FIG. 2, environment 200 may include digital device 110, a design tool 210, a design simulation tool 220, a digital device model 230, and a testing tool 240.

Design tool 210 may include one or more devices that include a software tool for developing a design for digital device 110. For example, design tool 210 may include a system to design a digital device using a text editing tool and/or graphical modeling tool (e.g., flow chart application, state diagram application, etc.) and to capture the design at the Register Transfer Level (RTL) using a hardware description language, such as Very High Speed Integrated Circuits Hardware Description Language (VHDL), System Verilog, etc. Design tool 210 may further include a synthesis tool to convert a design in a hardware description language into a gate level design. Design tool 210 may further include a layout tool to generate a layout of digital device 110 in terms of planar geometric shapes corresponding to patterns of semiconductor devices and metal interconnections between the devices based on the gate level design. Digital device 110 may be manufactured via manufacturing process 215 from the generated design.

Design simulation tool 220 may generate a digital device model 230 from the design of digital device 110. Digital device model 230 may be a virtual representation of the physical behavior of digital device 110.

Testing tool 240 may include one or more devices to test digital device model 230 and/or digital device 110. Testing tool 240 may perform a test on digital device model 230 and/or may perform a test on digital device 110 (e.g., on the manufactured physical device). For example, testing tool 240 may include an Automatic Test Pattern Generation (ATPG) tool that generates a test pattern 250 to test the operation of digital device 110. The ATPG tool may observe a pattern response 260 by pulsing digital device 110 through a particular number of clock cycles after inputting test pattern 250. During a test, clock gating of particular storage elements may be activated based on particular test patterns 250. If test pattern 250 activates clock gating for an A-phase storage element that provides input to a B-latch, activates clock gating for the B-latch, and activates clock gating for an A-phase storage element that receives an input from the B-latch at a same time, an A-B-A race may occur unless digital device 110 incorporates a way to prevent the A-B-A race from occurring. If the possibility of an A-B-A race is allowed, it may not be possible to accurately test digital device 110 using testing tool 240.

Although FIG. 2 shows example components of environment 200, in other implementations, environment 200 may include fewer components, different components, differently arranged components, or additional components than depicted in FIG. 2. Additionally or alternatively, one or more components of environment 200 may perform functions described as being performed by one or more other components of environment 200.

Figure 3:
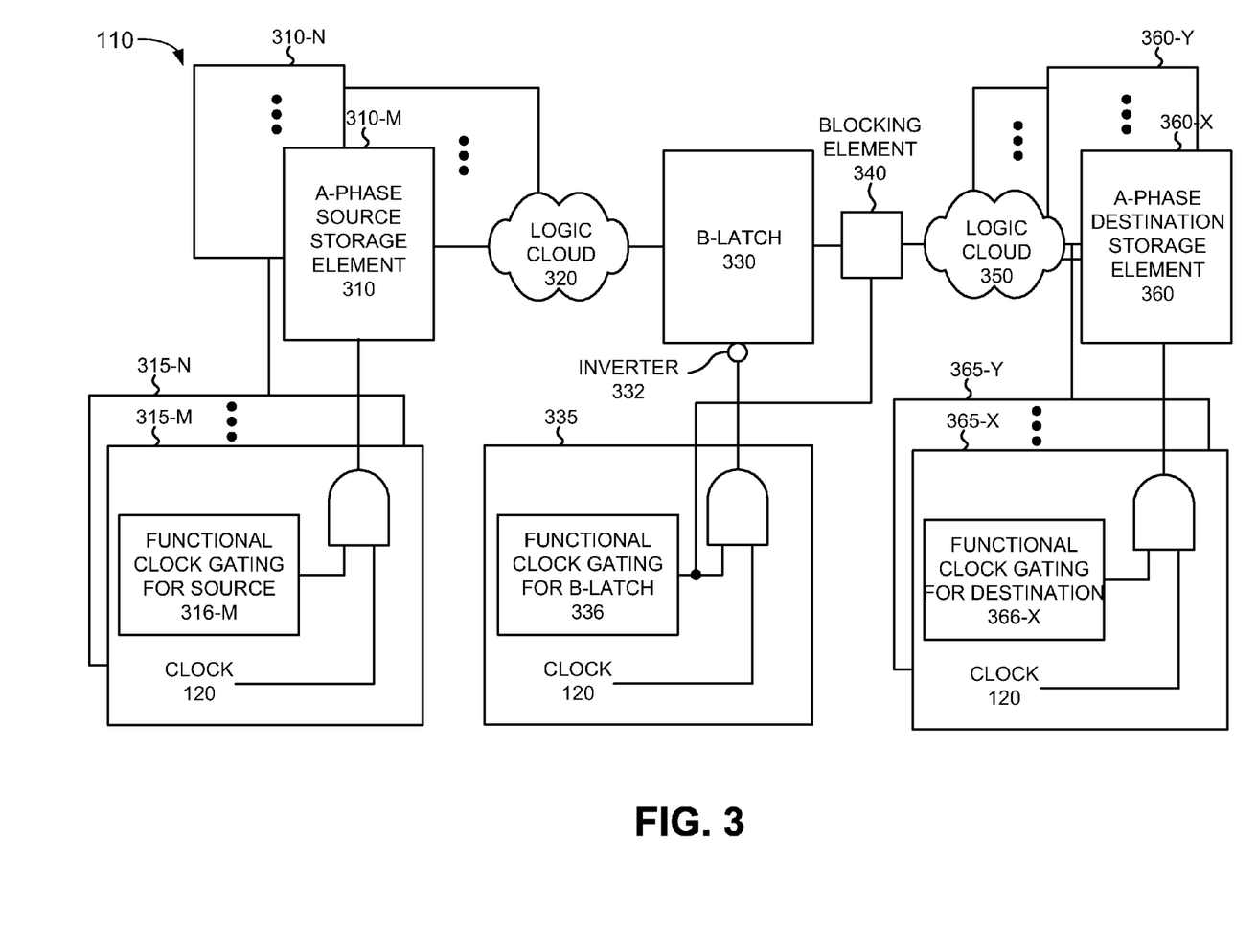
FIG. 3 is a diagram illustrating example components of a first example of the digital device of FIG. 1.

FIG. 3 is a diagram illustrating example components of a first example of digital device 110. As shown in FIG. 3, digital device 110 may include one or more A-phase source storage elements 310-M to 310-N (referred to herein collectively as "source storage elements 310" and individually as "source storage element 310"), one or more source clock gaters 315-M to 315-N (referred to herein collectively as "source clock gaters 315" and individually as "source clock gater 315"), a logic cloud 320, a B-latch 330, a B-latch clock gater 335, a blocking element 340, a logic cloud 350, one or more A-phase destination storage elements 360-X to 360-Y (referred to herein collectively as "destination storage elements 360" and individually as "destination storage element 360"), and one or more destination clock gaters 365-X to 365-Y (referred to herein collectively as "destination clock gaters 365" and individually as "destination clock gater 365").

Source storage element 310 may include a latch or a flip-flop that is activated during an A-phase of a clock cycle. For example, source storage element 310 may be activated during a rising edge of a clock cycle. Source clock gater 315 may deliver the clock signal to source storage element 310. Each particular source storage element 310 may be associated with a corresponding source clock gater 315.

Source clock gater 315 may include a functional clock gating for source block 316 ANDed with a signal from clock 120. Functional clock gating for source block 316 may control the clock gating for source storage element 310 and may determine when the clock signal reaches source storage element 310. For example, functional clock gating for source block 316 may be activated when source storage element 310 is to receive data.

Logic cloud 320 may include one or more combinational logic elements (e.g., logic gates) between source storage elements 310 and the input of B-latch 330. Logic cloud 320 may include a fan-in of the outputs of source storage elements 310 and a fan-out that corresponds to the input of B-latch 330.

B-latch 330 may include a latch that is active during a B-phase of a clock cycle. B-latch 330 may include inverter 332. As a result of inverter 332, B-latch 330 may be active when the clock signal is low with respect to the A-phase of the clock cycle. B-latch clock gater 335 may deliver the clock signal to B-latch 330. B-latch clock gater 335 may include a functional clock gating for B-latch block 336 ANDed with a signal from clock 120. Functional clock gating for B-latch block 336 may control the clock gating for B-latch 330 and may determine when the clock signal reaches B-latch 330. For example, functional clock gating for B-latch block 336 may be activated when B-latch is to receive data. As shown in FIG. 3, the input of a particular B-latch 330 may depend on multiple source storage elements (e.g., source storage elements 310-M to 310-N) and the output of the particular B-latch 330 may provide input to multiple destination storage elements 360 (e.g., destination storage elements 360-X to 360-Y). Furthermore, while a single B-latch 330 is shown in FIG. 3 for explanation purposes, digital device 110 may include multiple B-latches 330.

Blocking element 340 may include a logic element that takes as one input the output of B-latch 330 and as another input the output of functional clock gating for B-latch block 336. Blocking element 340 may ensure that the B-latch is transparent to data only when functional clock gating for B-latch block 336 is in a first state (e.g., an active state) and that outputs a constant value when functional clock gating for B-latch block 336 is in a second state (e.g., an inactive state). Thus, if the value stored by B-latch 330 were to change without the clock gating of B-latch 330 being enabled, the data may be blocked from affecting destination storage elements 360. In other words, blocking element 340 may prevent an output value of the B-latch 330 from changing when functional clock gating for B-latch block 336 is not enabled.

In one example, blocking element 340 may correspond to an AND gate. In another example, blocking element 340 may correspond to an OR gate. In yet another example, blocking element 340 may correspond to a multiplexer.

Logic cloud 350 may include one or more combinational logic elements (e.g., logic gates) between the output of B-latch 330 and the inputs of destination storage elements 360. The longest data path length of logic cloud 350 may not be allowed to exceed half a clock cycle in order to allow data to propagate to destination storage elements 360 in time. Therefore, the addition of blocking element 340 to the data path of logic cloud 350 may be added after checking to make sure that the addition of blocking element 340 would not increase the longest data path length from B-latch 330 to any of destination storage elements 360 past half of a clock cycle.

Destination storage element 360 may include a latch or a flip-flop that is activated during an A-phase of a clock cycle. Destination clock gater 365 may deliver the clock signal to destination storage element 360. Each particular destination storage element 360 may be associated with a corresponding destination clock gater 365. Destination clock gater 365 may include a functional clock gating for destination block 366 ANDed with a signal from clock 120. Functional clock gating for destination block 366 may control the clock gating for destination storage element 360 and may determine when the clock signal reaches destination storage element 360. For example, functional clock gating for destination block 366 may be activated when destination storage element 360 is to receive new data.

Although FIG. 3 shows example components of digital device 110, in other implementations, digital device 110 may include fewer components, different components, differently arranged components, or additional components than depicted in FIG. 3. Additionally or alternatively, one or more components of digital device 110 may perform functions described as being performed by one or more other components of digital device 110.

Figure 4:
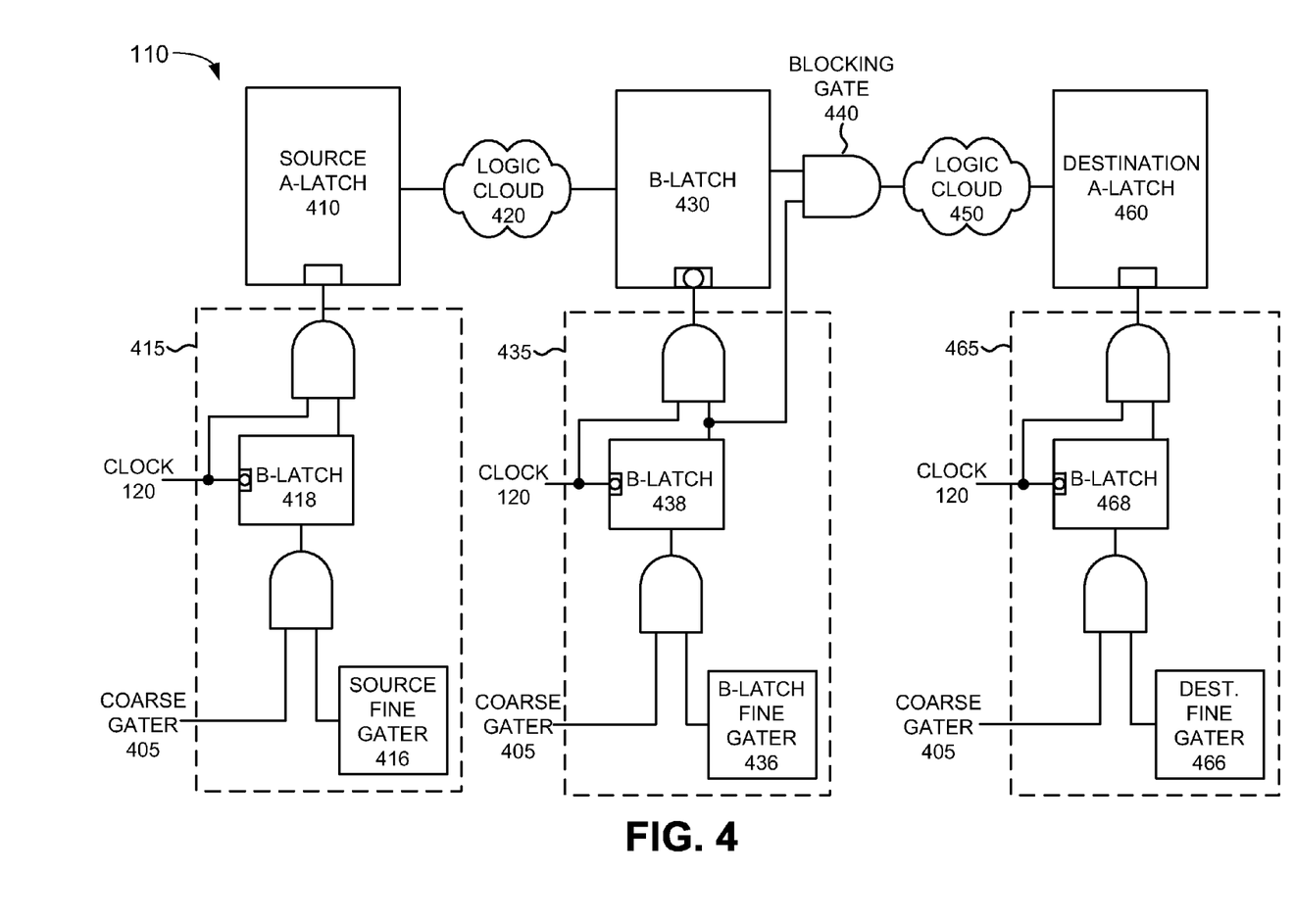
FIG. 4 is a diagram illustrating example components of a second example of the digital device of FIG. 1.

FIG. 4 is a diagram illustrating example components of a second example of digital device 110. FIG. 4 illustrates a particular implementation of digital device 110 shown in FIG. 3. For explanation purposes, only one source storage element and only one destination storage element are shown in FIG. 4. As shown, source storage element 310 may correspond to a source A-phase latch (referred to herein as an "A-latch") 410, destination storage element 360 may correspond to A-latch 460, and blocking element 340 may correspond to blocking AND gate 440.

Furthermore, FIG. 4 illustrates the use of latch-based clock gating in combination with a course gater and a fine gater. Latch-based clock gating may add a latch to capture the enable signal and hold the enable signal until a rising edge of the clock cycle has occurred, since the enable signal may not necessarily be stable at a rising edge of the clock cycle.

Source clock gater 315 may correspond to source clock gater 415. Source clock gater 415 may receive a signal from coarse clock gater 405. The signal from coarse clock gater 405 may be ANDed with the output of source fine clock gater 416. Coarse clock gater 405 may correspond to a global clock gater that controls clock gating for a large block of storage elements of digital device 110. Source fine clock gater 416 may correspond to a fine clock gater that controls clock gating of source A-latches 410 on a finer scale. The ANDed output of coarse clock gater 405 and source fine clock gater 416 may be stored in B-latch 418, which may hold the input until the clock signal from clock 120 is low (as shown by the fact that the clock input to B-latch 418 is inverted). The output of B-latch 418 and clock 120 may be ANDed and serve as the clock signal to source A-latch 410. With respect to destination A-latch 460, destination clock gater 365 may correspond to destination clock gater 465 (containing destination fine gater 466 and B-latch 468), which may operate similarly as described for source clock gater 415.

B-latch clock gater 335 may correspond to B-latch clock gater 435. B-latch clock gater 435 may also receive the signal from coarse clock gater 405. The signal from coarse clock gater 405 may be ANDed with the output of B-latch fine clock gater 436. The ANDed output of coarse clock gater 405 and B-latch fine clock gater 436 may be stored in B-latch 438, which may hold the input until the clock signal from clock 120 is low. The output of B-latch 438 and clock 120 may be ANDed and inverted and serve as the clock signal to B-latch 430. Furthermore, blocking AND gate 440 may receive as an input the output of B-latch 438, which may store the enable signal from the clock gaters (e.g., coarse gater 405 and B-latch fine gater 436). Thus, because of blocking AND gate 440, the output of B-latch 430 may change only when clock gating of B-latch 430 is enabled.

For example, if B-latch 430 is storing a value of '0' and the output of B-latch 438 is '0,' meaning clock gating of B-latch 430 is not enabled, and the input of B-latch 430 changes to '1,' the output of B-latch 430 may not change until the output of clock gating B-latch 438 changes to '1,' meaning that clock gating was enabled. Similarly, if B-latch 430 is storing a value of '1' and the output of B-latch 438 is '0,' meaning that clock gating of B-latch 430 is not enabled, and the input of B-latch 430 changes to '0,' the output of B-latch 430 may not change until the output of clock gating B-latch 438 changes to '1.'

Although FIG. 4 shows example components of digital device 110, in other implementations, digital device 110 may include fewer components, different components, differently arranged components, or additional components than depicted in FIG. 4. Additionally or alternatively, one or more components of digital device 110 may perform functions described as being performed by one or more other components of digital device 110.

Figure 5:
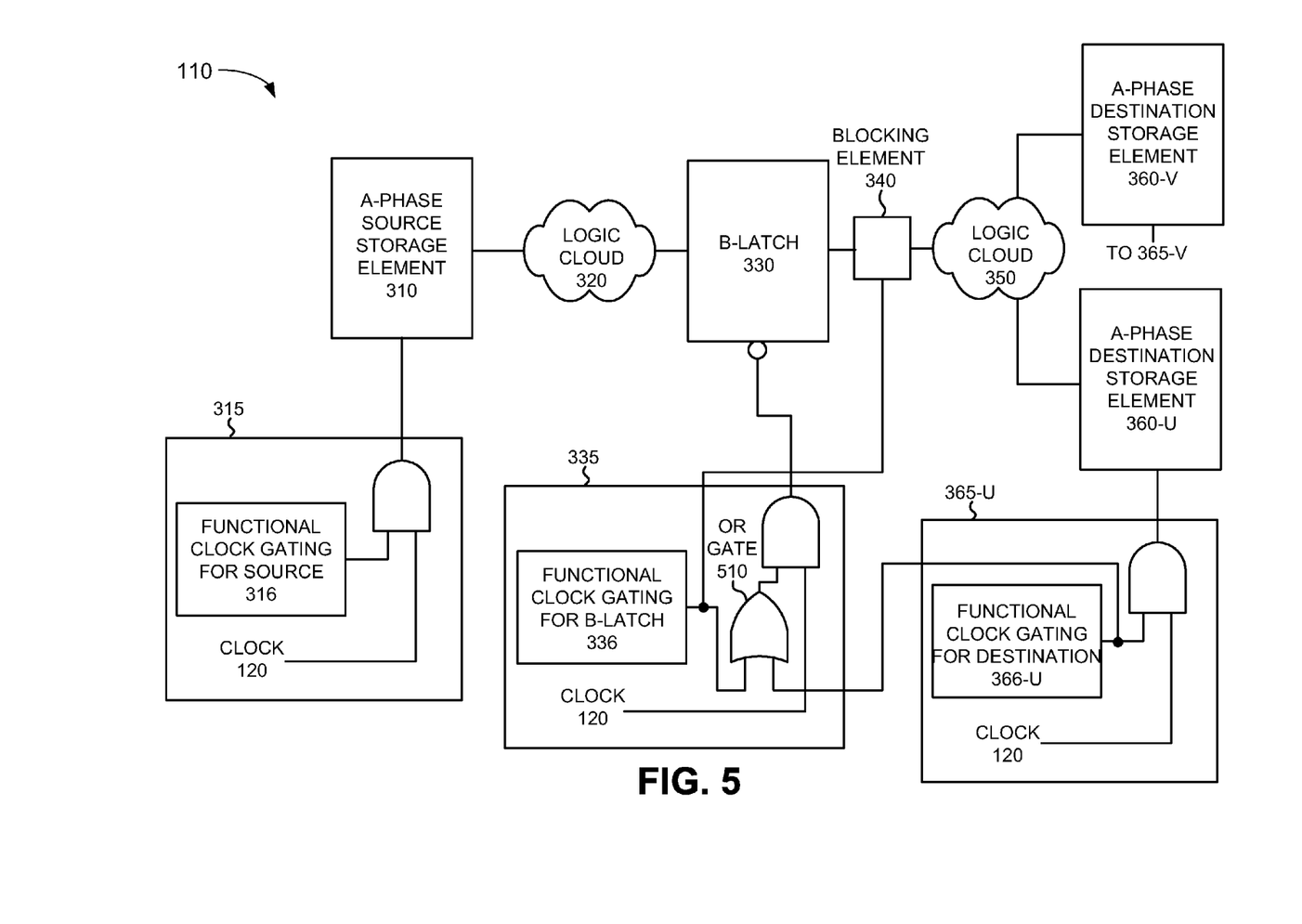
FIG. 5 is a diagram illustrating example components of a third example of the digital device of FIG. 1.

FIG. 5 is a diagram illustrating example components of a third example of digital device 110. In the example of FIG. 5, blocking element 340 may be combined with destination correlation of clock gating. B-latch 330 may fan-out to multiple destination storage elements 360, some of which may be correlated to B-latch 330 and some of which may not be able to be correlated to B-latch 330. For example, it may be possible to correlate the clock gating of destination storage element 360-U with the clock gating of B-latch 330 based on the physical layout of digital device 110 (e.g., by laying down a wire from clock gater 365-U to B-latch 330). However, it may not be possible to correlate the clock gating of destination storage element 360-V with B-latch 330 (e.g., it may not be possible to trace a wire from clock gater 365-V to B-latch 330).

Thus, in such a situation, the clock input to B-latch 330 may be correlated with the clock gating of destination storage element 360-U and B-latch 330 may also receive an input from clock gater 335. The outputs from functional clock gating for B-latch block 336 and functional clock gating for destination 366-U may be combined using OR gate 510. Thus, B-latch 330 may be enabled when the functional clock gater for B-latch 330 is active or when the functional clock gater for destination storage element 360-U is active, ensuring that data from source storage element 310 does not reach destination storage element 360-U via B-latch 330 unless destination storage element 360-U is ready to receive the data. Furthermore, blocking element 340 may be coupled to the output of functional clock gating for B-latch 336, ensuring that data from source storage element 310 does not reach destination storage element 360-V via B-latch 330 unless the functional clock gating for B-latch 330 is enabled.

Figure 6:
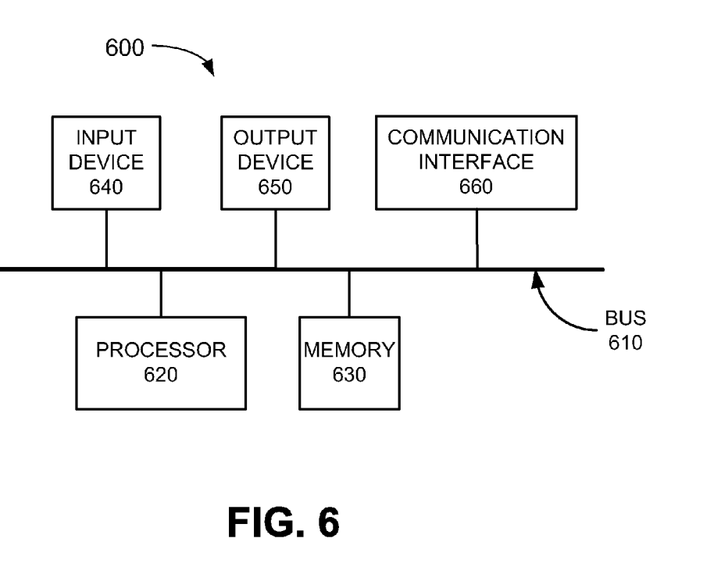
FIG. 6 is a diagram illustrating example components of the design tool or the testing tool of FIG. 1.

FIG. 6 is a diagram of example components of a device 600 that may correspond to design tool 210 or testing tool 240. Alternatively, each of design tool 210 and/or testing tool 240 may include one or more devices 600.

As shown in FIG. 6, device 600 may include a bus 610, a processor 620, a memory 630, an input unit 640, an output unit 650, and a communication interface 660. Bus 610 may include a path that permits communication among the components of device 600. Processor 620 may include a single-core processor, multi-core processor, microprocessor, and/or processing logic that may interpret and execute instructions. Memory 630 may include any type of dynamic storage device that may store information and instructions, for execution by processor 620, and/or any type of non-volatile storage device that may store information for use by processor 620.

Input unit 640 may include a mechanism that permits a user to input information to device 600, such as a keyboard, a keypad, a button, a switch, etc. Output unit 650 may include a mechanism that outputs information to the user, such as a display, a speaker, one or more light emitting diodes (LEDs), etc. Communication interface 660 may include any transceiver-like mechanism that enables device 600 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 660 may include mechanisms for communicating with another device or system via a network. In one alternative implementation, communication interface 660 may be a logical component that includes input and output ports, input and output systems, and/or other input and output components that facilitate the transmission of data to other devices.

As will be described in detail below, device 600 may perform certain operations relating to selecting a method for preventing an A-B-A race in a latch-based digital device and/or relating to validating a design of a latch-based digital device. Device 600 may perform these operations in response to processor 620 executing software instructions contained in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions contained in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

Although FIG. 6 shows example components of device 600, in other implementations, device 600 may include fewer components, different components, differently arranged components, or additional components than depicted in FIG. 6. Additionally or alternatively, one or more components of device 600 may perform functions described as being performed by one or more other components of device 600.

Figure 7:
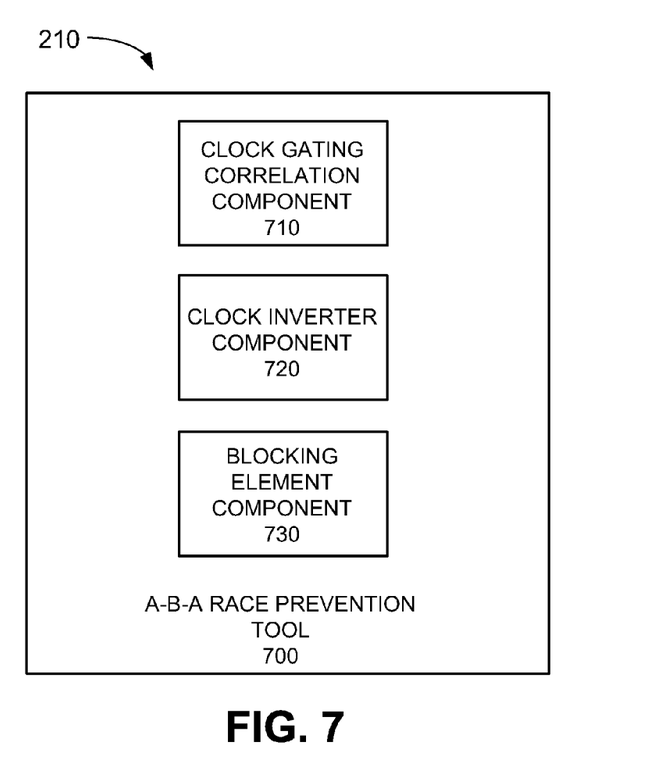
FIG. 7 is a diagram illustrating example functional components of the design tool of FIG. 1.

FIG. 7 is a diagram illustrating example functional components of design tool 210. The functional components of design tool 210 may be implemented as a result of processor 620 executing instructions from memory 630. As shown in FIG. 7, design tool 210 may include an A-B-A race prevention tool 700. A-B-A race prevention tool 700 may be used during the design process to incorporate design elements into digital device 110 that prevent race conditions from occurring during testing and/or operation of digital device 110. For example, A-B-A race prevention tool 700 may, for a particular B-latch, determine all source storage elements associated with the B-latch and may determine all destination storage elements associated with the B-latch.

A-B-A race prevention tool 700 may include a clock gating correlation component 710, a clock inverter component 720, and a blocking element component 730. Clock gating correlation component 710 may determine whether clock gating of a B-latch may be correlated with either source storage elements or with destination storage elements. For example, clock gating correlation component 710 may analyze a layout of digital device 110 to determine whether a wire may be traced from the outputs of clock gaters of all the destination storage components associated with the particular B-latch to a clock input of the particular B-latch and whether the outputs of the clock gaters may be ORed together. If all the destination storage elements cannot be correlated, clock gating correlation component 720 may correlate the clock gaters of as many of the destination storage elements as possible. If the clock gaters of all the associated destination storage elements may not be correlated, clock gating correlation component 720 may perform a similar analysis with respect to the associated source storage elements.

Clock inverter component 720 may determine whether the clock signal to the input of the particular B-latch may be driven by an inverted clock signal. For example, an inverter may be added to the clock signal before the clock signal is ANDed with the functional clock gating for the particular B-latch. The inverter may convert the clock signal into the particular B-latch from a B-phase clock to an A-phase clock. Clock inverter component 720 may determine whether the inverter may be added based on the layout of digital device 110 and whether driving the particular B-latch with an inverted clock signal is desirable with respect to the timing requirements associated with the design of digital device 110.

Blocking element component 730 may determine whether a blocking element may be added to the output of the particular B-latch. For example, blocking element component 730 may compute a longest logic path from the output of the particular B-latch to a destination storage element and may determine whether adding the blocking element would extend the longest logic path past half of a clock cycle.

Although FIG. 7 shows example functional components of design tool 210, in other implementations, design tool 210 may include fewer functional components, different functional components, differently arranged functional components, or additional functional components than depicted in FIG. 7. Additionally or alternatively, one or more functional components of design tool 210 may perform functions described as being performed by one or more other functional components of design tool 210.

Figure 8:
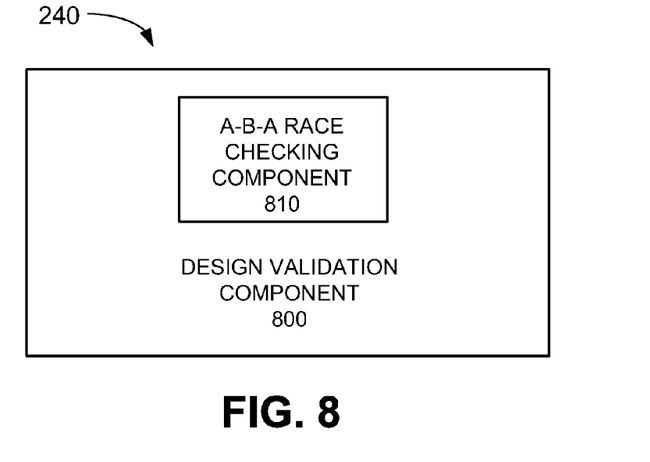
FIG. 8 is a diagram illustrating example functional components of the testing tool of FIG. 1.

FIG. 8 is a diagram of example functional components of testing tool 240. The functional components of testing tool 240 may be implemented as a result of processor 620 executing instructions from memory 630. As shown in FIG. 8, testing tool 240 may include a design validation component 800.

Design validation component 800 may validate a design of digital device 110 by analyzing digital device model 230. Design validation component 800 may include an A-B-A race checking component 810. A-B-A race checking component 810 may determine whether a design of digital device 110 allows race conditions. A valid design may not allow race conditions to occur. A-B-A race checking component 810 may add blocking element 340 to digital device model 230 and may determine whether test pattern 250 results in a different pattern response 260 when blocking element 340 is added to digital device model 230. A valid design may not generate a different pattern response 260 when blocking element 340 is added.

Although FIG. 8 shows example functional components of testing tool 240, in other implementations, testing tool 240 may include fewer functional components, different functional components, differently arranged functional components, or additional functional components than depicted in FIG. 8. Additionally or alternatively, one or more functional components of testing tool 240 may perform functions described as being performed by one or more other functional components of testing tool 240.

Figure 9:
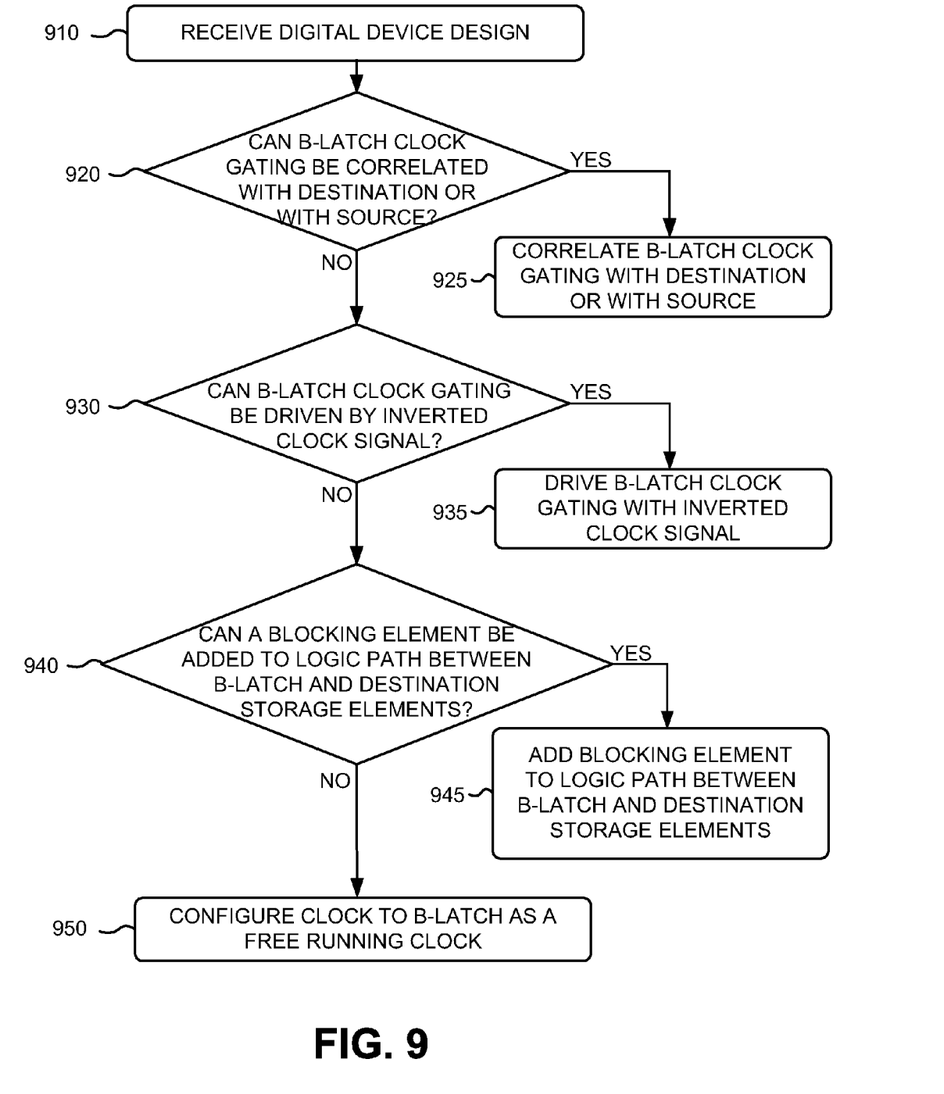
FIG. 9 is a flow chart of an example process for configuring a digital device design to prevent a race condition according to an implementation described herein.

FIG. 9 is a flow chart of an example process for selecting a method for preventing an A-B-A race in a latch-based digital device. In one implementation, the process of FIG. 9 may be performed by design tool 210. In other implementations, some or all of the process of FIG. 9 may be performed by another device or a group of devices separate from and/or including design tool 210.

The process of FIG. 9 may include receiving a digital device design (block 910). For example, design tool 210 may receive a design of digital device 110 for selecting a method of preventing A-B-A races in digital device 110. A determination may be made as to whether B-latch clock gating can be correlated with destination storage elements or with source storage elements (block 920). For example, clock gating correlation component 710 may determine whether a wire may be traced from the outputs of clock gaters of all (or at least some) of the destination storage components associated with the particular B-latch to a clock input of the particular B-latch and whether the outputs of the clock gaters may be ORed together. If the clock gaters of all the associated destination storage elements may not be correlated, clock gating correlation component 720 may determine whether a wire may be traced from the outputs of clock gaters of all the source storage components associated with the particular B-latch to a clock input of the particular B-latch and whether the outputs of the clock gaters may be ORed together.

If it is determined that the B-latch can be correlated with either destination storage elements or with source storage elements (block 920—YES), the clock gating of the B-latch may be correlated with either the destination storage elements or with the source storage elements. For example, clock gating correlation component 710 may add connections from the clock gaters of the destination storage elements, OR the connections, and connect the connections to the clock input of the B-latch. If all the destination storage elements cannot be correlated, clock gating correlation component 720 may correlate the clock gaters of as many of the destination storage elements as possible and may determine that a blocking element needs to be added at the output of the B-latch to prevent race conditions from occurring with respect to the destination storage elements that could not be correlated. In such a situation, processing may continue to block 945 (process path not shown in FIG. 9).

If the destination storage clock elements cannot be correlated, but the source storage elements can be correlated, clock gating correlation component 710 may add connections from the functional clock gaters of the source storage elements, OR the connections, and connect the connections to the clock input of the B-latch. If it is determined that the B-latch clock gating cannot be correlated with either destination storage elements or with source storage elements (block 920—NO), processing may continue to block 930.

A determination may be made as to whether B-latch clock gating can be driven by an inverted clock signal (block 930). For example, clock inverter component 720 may determine whether an inverter may be added based on the layout of digital device 110 and whether driving the particular B-latch with an inverted clock signal is desirable with respect to the timing requirements associated with the design of digital device 110.

If it is determined that B-latch clock gating can be driven by an inverted clock signal (block 930—YES), the B-latch clock may be driven by an inverted clock signal. For example, clock inverter component 720 may add an inverter to the clock signal before the clock signal is ANDed with the functional clock gating for the particular B-latch. If it is determined that B-latch clock gating cannot be driven by an inverted clock signal (block 930—NO), processing may continue to block 940.

A determination may be made as to whether a blocking element may be added to a logic path between the B-latch and destination storage elements (block 940). For example, blocking element component 730 may compute a longest logic path from the output of the particular B-latch to a destination storage element and may determine whether adding the blocking element would extend the longest logic path past half of a clock cycle.

If it is determined that the blocking element may be added to the logic path between the B-latch and the destination storage elements (block 940—YES), blocking element component 730 may add blocking element 340 at the output of the particular B-latch and may connect the other input of blocking element 340 to the output of functional clock gating for B-latch 336. Blocking element component 730 may add blocking element 340 to the design of digital device 110 in combination with partial correlation of destination storage elements (e.g., when clock gaters of some but not all destination storage elements could be correlated with the clock gating of B-latch). If it is determined that a blocking element cannot be added to the logic path between the B-latch and the destination storage elements (block 940—NO), processing may continue to block 950.

Clock gating to the B-latch may be configured as a free running clock (block 950). For example, design tool 210 may remove, or inactivate, B-latch clock gater 335 if none of the methods of preventing an A-B-A race could be selected. Without B-latch clock gater 335, B-latch 330 may be clocked with a free running clock, meaning that B-latch 330 is clocked at every clock cycle. While a free running clock may not be desirable from a power saving perspective, if only one B-latch is involved, the loss in power savings may not be significant.

Figure 10:
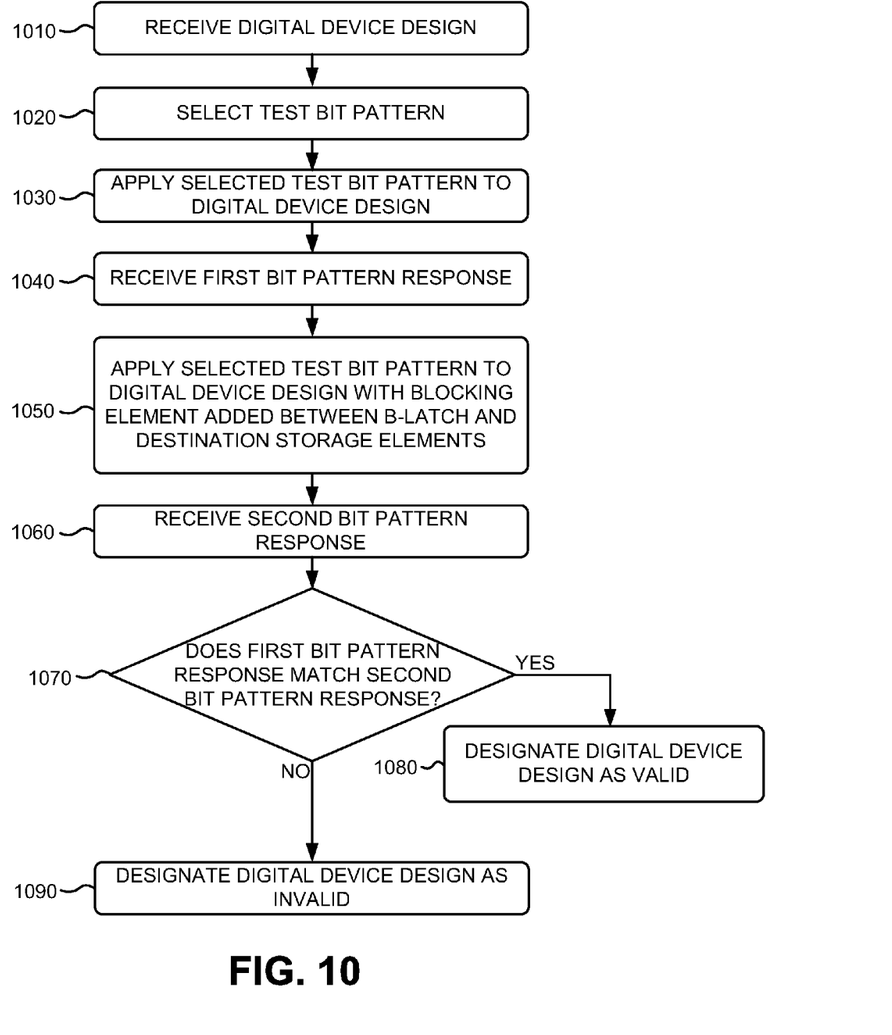
FIG. 10 is a flow chart of an example process for validating a digital device design with respect to race conditions according to an implementation described herein.

FIG. 10 is a diagram of an example signal flow for validating a design of a latch-based digital device. In one implementation, the process of FIG. 10 may be performed by testing tool 240. In other implementations, some or all of the process of FIG. 10 may be performed by another device or a group of devices separate from and/or including testing tool 240.

The process of FIG. 10 may include receiving a digital device design (block 1010). For example, testing tool 240 may receive digital device model 230 for validating digital device model 230 with respect to whether digital device model 230 allows race conditions to occur. A test bit pattern may be selected (block 1020). For example, A-B-A race checking component 810 may select a particular bit pattern that may activate functional clock gating for source 316, functional clock gating for B-latch 336, and functional clock gating for destination 366. When all three functional clock gating components are active, an A-B-A race condition may occur if a design does not take into account prevention of race conditions.

The selected test bit pattern may be applied to the digital device design (block 1030) and a first bit pattern response may be received (block 1040). For example, testing tool 240 may apply the selected test bit pattern to digital device model 230 and may receive the bit pattern response generated by digital device model 230.

The selected test bit pattern may be added to the digital device design with the blocking element added between the B-latch and the destination storage elements associated with the B-latch (block 1050) and a second bit pattern may be received (block 1060). For example, testing tool 240 may instruct design tool 210 (or design simulation tool 220) to add blocking element 340 to digital device model 230 and may apply the selected test bit pattern to the modified digital device model 230 and may receive the bit pattern response generate by digital device model 230.

A determination may be made as to whether the first bit pattern response matches the second bit pattern response (block 1070). For example, A-B-A race checking component 810 may compare the first bit pattern response with the second bit pattern response. If it is determined that the first bit pattern matches the second bit pattern response (block 1070—YES), the digital device design may be designated as valid (block 1080). Since the addition of blocking element 340 did not result in a different test pattern response, digital device 110 may have been designed in a way that does not cause race conditions to occur.

If it is determined that the first bit pattern does not match the second bit pattern response (block 1070—NO), the digital device design may be designated as not valid (block 1090). Since the addition of blocking element 340 results in a different test bit pattern response, a race condition may have occurred and digital device 110 may have been designed in a way that allows race conditions to occur, which may indicate an invalid design. The designation of whether the design of digital device 110 is valid may be provided to the designer. If the design has been designated as invalid, the designer may adjust the design to prevent race conditions from occurring during testing and/or operation of digital device 110.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with respect to FIGS. 9 and 10, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a latch activated during a second phase of a clock cycle;
   a clock gating component to control when a clock signal is to reach the latch;
   a destination storage element activated during a first phase of the clock cycle, where a logical path exists from the latch to the destination storage element; and
   a blocking element located in the logical path from the latch to the destination storage element, where the blocking element includes, as a first input, an output of the latch and, as a second input, an output of the clock gating component, and where the blocking element prevents an output value of the latch from changing when the clock gating component is not enabled and does not prevent the output value of the latch from changing when the clock gating element is enabled.

2. The device of claim 1, further comprising:
   an AND gate that includes, as a first input, the output of the clock gating component, that includes, as a second input, the clock signal, and that includes an output that corresponds to a clock signal input to the latch.

3. The device of claim 1, where the blocking element includes an AND gate.

4. The device of claim 1, where the blocking element includes an OR gate.

5. The device of claim 1, where the blocking element includes a multiplexer.

6. The device of claim 1, where the device further includes:
   a source storage element activated during the first phase of the clock cycle, where a logical path exists from an output of the source storage element to an input of the latch; and
   a source clock gating component to control when the clock signal is to reach the source storage element.

7. The device of claim 6, where the source storage element includes a source latch and where the destination storage element includes a destination latch.

8. The device of claim 1, further including:
   a destination clock gating component to control when the clock signal is to reach the destination storage element.

9. The device of claim 8, further including an OR gate that combines an output of the destination clock gating component with the clock gating component, where the OR gate is to correlate clock gating of the latch with clock gating of the destination storage element.

10. A method comprising:
    determining, by a computer device, whether clock gating of a latch, included in a digital device, can be correlated with clock gating of either a destination storage element or a source storage element, based on a layout of the digital device, where the latch is in a logical path from the source storage element to the destination storage element;
    correlating, by the computer device, the clock gating of the latch with the clock gating of either the destination storage element or source storage element, when the clock gating of the latch can be correlated with the clock gating of either the destination storage element or source storage element; and
    adding, by the computer device, a blocking element to a logical path from the latch to the destination storage element, where the blocking element includes, as a first input, an output of the latch and, as a second input, an output of a clock gating component associated with the latch, and where the blocking element prevents an output value of the latch from changing when the clock gating component is not enabled, when the clock gating of the latch cannot be correlated with the clock gating of either the destination storage element or source storage element.

11. The method of claim 10, further comprising:
    identifying a plurality of destination storage elements included in the digital device, where a particular one of the plurality of destination storage elements is associated with a logic path from an output of the latch to an input of the particular one of the plurality of destination storage elements;
    where determining whether clock gating of the latch can be correlated with clock gating of either a destination storage element or a source storage element includes:
    determining that clock gating of the latch can be correlated with clock gating of all of the plurality of destination storage elements; and
    where correlating the clock gating of the latch with the clock gating of either the destination storage element or source storage element includes:
    correlating the clock gating of the latch with all of the plurality of destination storage elements, when the clock gating of the latch can be correlated with clock gating of all of the plurality of destination storage elements.

12. The method of claim 10, further comprising:
    identifying a plurality of destination storage elements included in the digital device, where a particular one of the plurality of destination storage elements is associated with a logic path from an output of the latch to an input of the particular one of the plurality of destination storage elements;

where determining whether clock gating of the latch can be correlated with clock gating of either a destination storage element or a source storage element includes:

determining that clock gating of the latch can be correlated with clock gating of some, but not all, of the plurality of destination storage elements;

where correlating the clock gating of the latch with the clock gating of either the destination storage element or source storage element includes:

correlating the clock gating of the latch with the some of the plurality of destination storage elements, when the clock gating of the latch can be correlated with clock gating of the some of the plurality of destination storage elements; and where adding the blocking element to the logical path from the latch to the destination storage element includes:

adding the blocking element to the logical path from the latch to the destination storage element when the clock gating of the latch can be correlated with clock gating of the some of the plurality of destination storage elements.

13. The method of claim 10, further comprising:

determining whether the clock gating of the latch can be driven by an inverted clock signal, when the clock gating of the latch cannot be correlated with the clock gating of either the destination storage element or source storage element; and driving the clock gating of the latch by the inverted clock signal, when the clock gating of the latch can be driven by the inverted clock signal; and where adding the blocking element to the logical path from the latch to the destination storage element includes:

adding the blocking element to the logical path from the latch to the destination storage element when the clock gating of the latch cannot be driven by the inverted clock signal.

14. The method of claim 10, further comprising:

determining whether adding the blocking element to the logical path from the latch to the destination storage element would increase a propagation time of the logical path to longer than half of a clock cycle; and where adding the blocking element to the logical path from the latch to the destination storage element includes:

adding the blocking element to the logical path from the latch to the destination storage element when adding the blocking element to the logical path from the latch to the destination storage element would not increase a propagation time of the logical path to longer than half of a clock cycle.

15. The method of claim 14, further comprising:

configuring the latch to be clocked with a free running clock, when adding the blocking element to the logical path from the latch to the destination storage element would increase a propagation time of the logical path to longer than half of a clock cycle.

16. The method of claim 10, where the blocking element includes an AND gate.

17. A method comprising:

receiving, by a computer device, a digital device design;

selecting, by the computer device, a test bit pattern;

applying, by the computer device, the test bit pattern to the digital device design to receive a first bit pattern response;

modifying, by the computer device, the digital device design by adding a blocking element to the digital device design, where the blocking element is added to a logical path from a latch, clocked during a second phase of a clock cycle, to a destination storage element, clocked during a first phase of the clock cycle;

applying, by the computer device, the test bit pattern to the modified digital device design to receive a second bit pattern response;

determining, by the computer device, whether the first bit pattern response matches the second bit pattern response; and designating, by the computer device, the digital device design as invalid when the first bit pattern response does not match the second bit pattern response and as valid when the first bit pattern response matches the second bit pattern response.

18. The method of claim 17, where designating the digital device design as invalid includes designating the digital device design as a design that allows race conditions to occur.

19. The method of claim 17, where the computer device includes an automatic test pattern generation tool.

20. The method of claim 17, where selecting the test bit pattern includes:

selecting a test bit pattern that enables clock gating of a source storage element associated with the latch, enables clock gating of the latch, and enables clock gating of the destination storage element to occur simultaneously.

* * * * *